Figure 1:
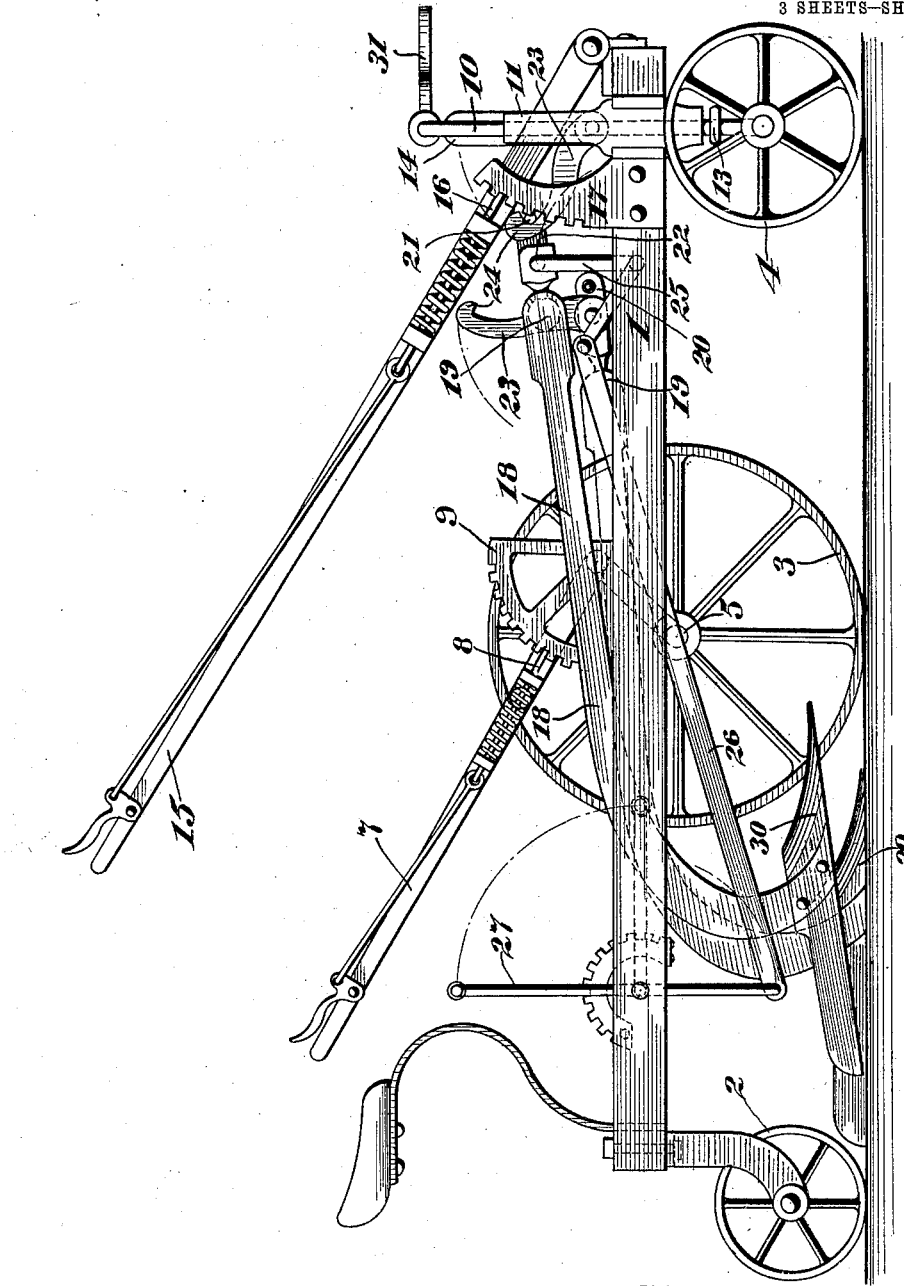

N. & A. SILLER.
GANG PLOW.
APPLICATION FILED SEPT. 1, 1909.

983,575.

Patented Feb. 7, 1911.
3 SHEETS—SHEET 1.

Witnesses:

NELS SILLER &
ALBIN SILLER
Inventors

By ____ Attorneys

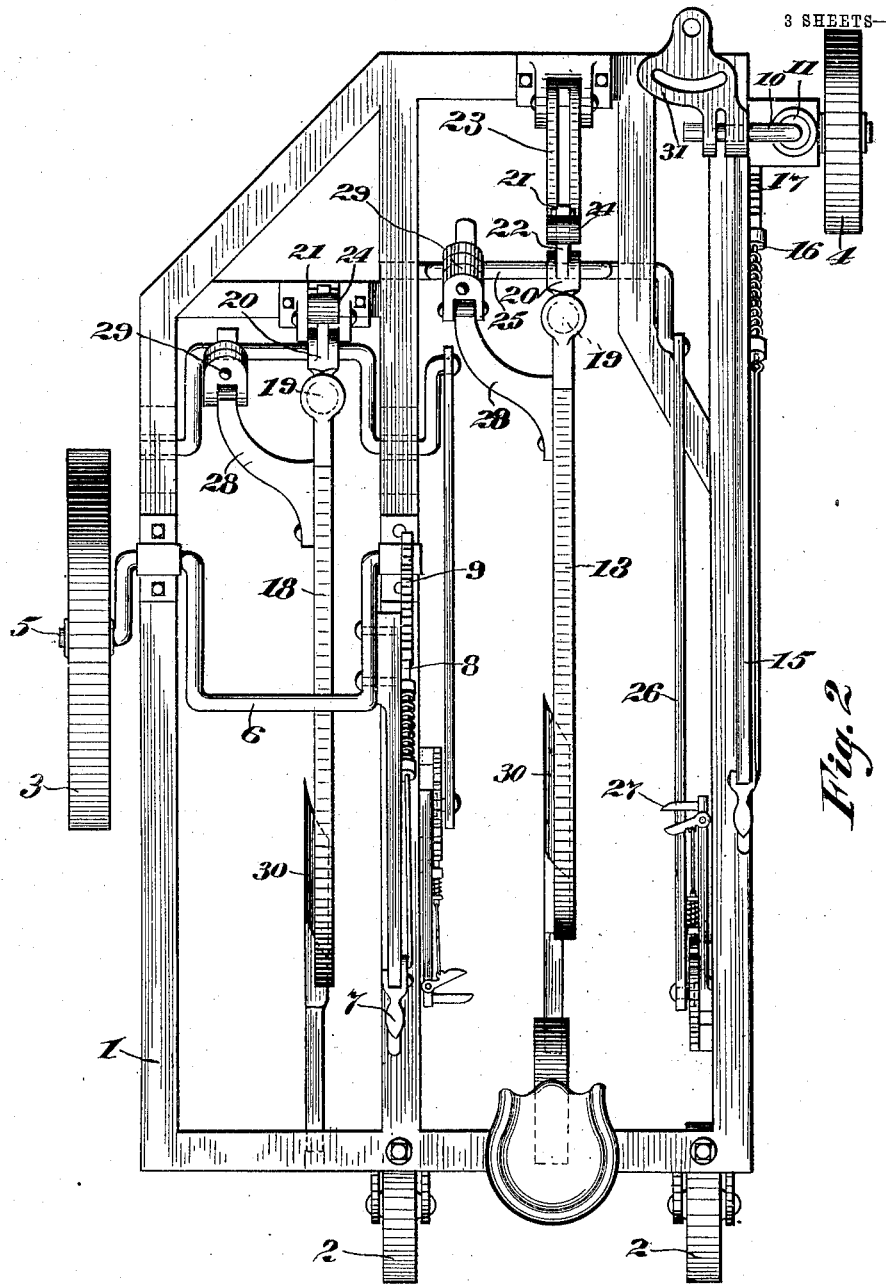

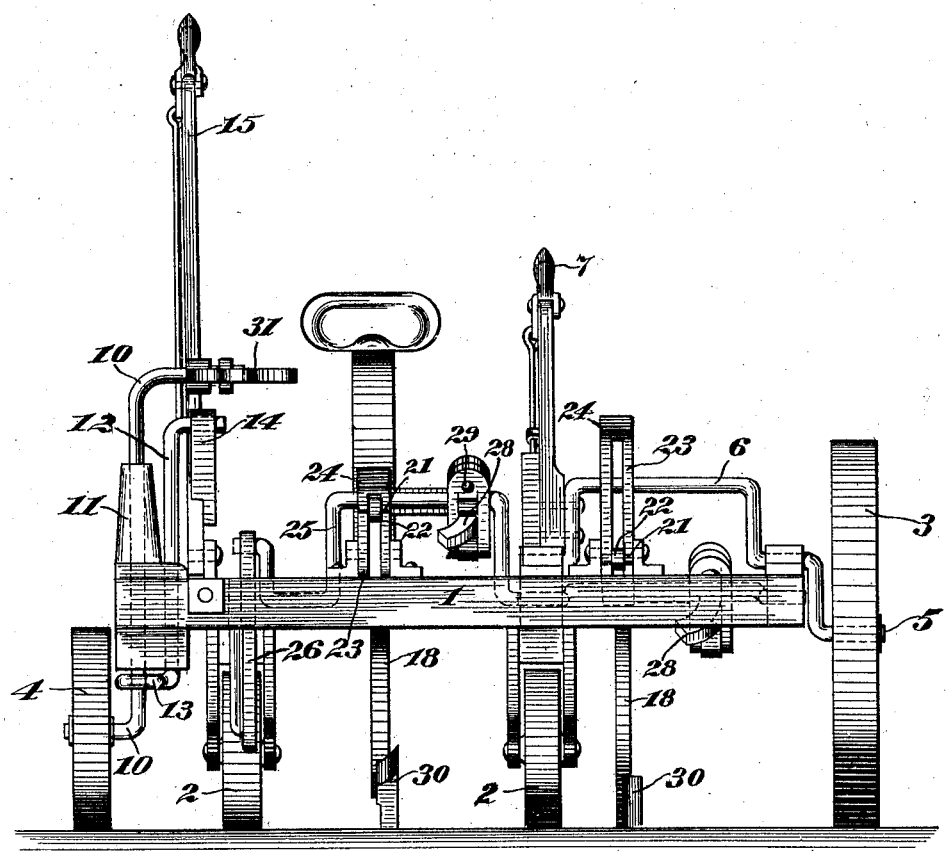

UNITED STATES PATENT OFFICE.

NELS SILLER AND ALBIN SILLER, OF HARROWBY, MANITOBA, CANADA.

GANG-PLOW.

983,575.  Specification of Letters Patent.  Patented Feb. 7, 1911.

Application filed September 1, 1909. Serial No. 515,691.

*To all whom it may concern:*

Be it known that we, NELS SILLER and ALBIN SILLER, subjects of the King of Great Britain, residing at Harrowby, county of Russell, in the Province of Manitoba, Canada, have invented certain new and useful Improvements in Gang-Plows; and we do hereby declare that the following is a full, clear, and exact description of the invention, such as will enable others skilled in the art to which it appertains to make and use the same.

The invention to be hereinafter described relates to gang plows, and particularly to gang plows of the individually adjustable plow type.

Broadly speaking, it comprises a wheeled frame adapted to support a plurality of separate and independent adjustable plows, flexible connections between the plows and the frame, means for moving the independent plows to operative or inoperative position, as may be desired, and means for automatically tilting each individual plow as it is raised.

In order to more clearly disclose the construction, operation and use of the invention, reference should be had to the accompanying drawings forming part of the present application.

In the drawings: Figure 1 is a side elevation of the invention, complete; Fig. 2 is a plan view of the same; and, Fig. 3 is a front view of the same.

The main objects of the invention are to provide a gang plow in which the separate plows are independent of each other and have independent movements relatively to their supporting frame, and one in which each plow will be automatically tilted to one side as it reaches the rearward limit of movement in the supporting frame.

In the preferred form of the invention, a supporting frame 1 is provided. This frame is mounted on a forward steering wheel 4, rear wheels 2 or trailers, and an adjustable side wheel 3 which is made adjustable to vary the inclination or cant of the frame 1, and, to that end, is mounted on the outer crank 5 of a crank shaft 6, which is journaled in the longitudinal members of the frame. To the vertical arm adjacent the opposite end of the crank shaft is secured a hand lever 7, provided with a catch adapted to selectively engage notches in the arc plate 9 secured to the frame 1.

As the lever 7 is swung forward or backward, it will raise or lower the wheel 3, the frame 1 being tilted accordingly. The steering wheel 4 is also adapted to be adjusted vertically. To that end, its axle 10 is bent at right angles and passed through an opening in the frame, and through a tubular sleeve 11 and extended vertically some distance above the top of the sleeve. The upper end of this axle is a second time bent at right angles, so that both ends are parallel and extend in opposite directions. A rod 12, connected at one end to a vertically movable block 14, has its opposite end formed into a loop or eye 13 adapted to freely receive the vertical part of the axle 10. When the loop 13 is moved down into engagement with the outwardly bent portion of the axle 10, it will carry the axle and wheel 4 down with it. To effect such downward movement of the loop 13, a hand lever 15, pivoted to the frame 1, has been connected to the block 14, and is provided with a catch 16 adapted to selectively engage the notches in the arc plate 17 made fast to the frame 1, to lock the wheel 4 in various adjusted positions.

Each of the plow beams 18 is connected by a universal ball and socket joint 19 to a block 20, which is provided with a head 21 and a shank 22. The shank 22 passes through a link 23 pivotally mounted on the front cross beam of the frame 1, while the head 21 slides freely over the upper surface of the link, and is adapted to be seated in the up-turned hook-shaped end 24 as the plow reaches its extreme rearward limit. The block 20 is journaled on the crank of a crank shaft 25, adapted to be operated by a link 26 connected to the elbow hand lever 27, which is provided with the usual segment rack and coöperating catch to lock said lever and connected parts in the various positions of adjustment—for instance, to lock them in an inoperative position for transportation. Operation of the lever 27 will effect operation of the crank 25, which will cause vertical movement of the block 20 and plow beam 18.

The universal joint 19, of course, permits movement of the beam 18 in every possible direction. It is necessary to limit, to one direction, the movement of the plow beam 18 about its longitudinal axis. To this end, a slightly downwardly and forwardly curved lever arm 28 is secured rigidly to the beam 18 at a considerable distance from its forward end. The free end of this lever arm is passed through a guide block 29, mounted on the crank shaft 25, at a considerable distance from the block 20, and provided with an anti-friction roller or other device to allow easy travel of the lever 28 through the block. The block 20 with its connected parts constitutes a lever fulcrumed on the crank 25. The arm 28 has a sliding connection direct with the crank 25, whereas the end of the plow beam has no direct connection with the crank. It is connected by a universal joint to the ball formed on the rear end of the block 20. As the plow beam moves rearwardly, the block 20 and its connected parts will be in alinement with the beam. The crank 25, of course, continues to rise as the beam moves rearwardly. The extreme rearward limit of movement of the plow beam is determined by seating of the head 21 in the hooked end 24 of the link 23. When the head 21 is seated in the hooked end 24, further rearward movement of the beam will be prevented. Any rearward pull on the plow beam, after seating of the head 21, will tend to move the block 20 and its connected parts to a horizontal position. The head 21 at the instant of seating, of course, is higher than the ball end of the block. Furthermore, any rearward pull on the head 21, in the direction of the length of the plow beam, will cause the link 23 to swing downwardly, carrying the head 21 with it, of course. As the head 21 is pulled down, the ball connected to the end of the plow beam is swung up. This, of course, causes the end of the plow beam to rise. As the end of the plow beam rises, the end of the arm 28 will engage the roller in the block 29 and cause the plow beam 19 to twist or turn about its longitudinal axis, thus throwing the plowshare outward as it reaches the limit of its upward tilt. The rising of the forward end of the plow beam, of course, effects a similar rising of the plowshare point. The combined upward and outward movement of the plowshare point causes the plowshare to run out of the ground. The position of the plowshare as the block 20 reaches its highest point, is shown, in full lines, in Fig. 1. The link or plate 31 is connected to the bent-over upper end of the axle 10, and is adapted to have a handle or operating rod connected thereto for turning the steering wheel 4.

The operation of the invention is as follows: The wheel 4 is adjusted so that the frame 1 will be the right height above the ground. If the plow is to be used on a hillside, the wheel 3 will be adjusted to give the frame the necessary slant to insure penetration to all of the plows to the same depth. When so adjusted, the frame will be drawn forward by any suitable traction means. Should an obstruction appear in the path of any one of the plows, the corresponding lever 27 will be swung forward by the driver, causing elevation of the crank 25 and the front end of the plow beam 18; the lever arm 28 and block 29 coöperating to turn the plow beam about its longitudinal axis. As the crank 25 moves upwardly and rearwardly, the shank 22 of the block 20 will travel freely in the slot in the link 23, and the head 21 will finally be seated in the hooked end 24 of the link. This sliding connection allows the frame 1 to move a short distance forward, without carrying the plow with it. As soon as the head 21 is seated in the hooked end 24, traction of the plow again commences. However, by this time the plow point has been raised and the next rearward strain on the plow beam acts to turn it outwardly to avoid the obstruction, so that no damage will be done. Should the plow point encounter a hidden or unseen obstruction, it will be driven backward, causing the same operation of the crank 25, with the same result as though the crank had been operated by hand.

It is clear that changes may be made in the construction, operation and use of the invention, without in any way departing from the field and scope of the same, and it is meant to include all such within this application, wherein only a preferred form has been disclosed.

Having thus fully described our invention, what we claim as new and desire to secure by Letters Patent, is:—

1. A gang plow of the character described, comprising a wheeled supporting frame, a crank shaft journaled in said frame, a block loosely mounted on said crank shaft, a link movably connected to said frame, connections between the link and the block, a plow, and connections between the beam of said plow and said block.

2. A gang plow of the character described, comprising a wheeled supporting frame, a crank shaft journaled in said frame, a block loosely mounted on said crank shaft, a link movably connected to said frame, connections between the link and the block, a plow, connections between the beam of said plow and said block, and means for causing said plow beam to turn about its longitudinal axis.

3. A gang plow of the character described, comprising a wheeled supporting frame, a crank shaft journaled in said frame, a block loosely mounted on said crank shaft, a link movably connected to said frame, connections between the link and the block, a plow, connections between the beam of said plow and said block, and means for operating said crank shaft.

4. A gang plow of the character described, comprising a wheeled supporting frame, a crank shaft journaled in said frame, a block loosely mounted on said crank shaft, a link movably connected to said frame, connections between the link and the block, a plow, and universal connections between the beam of said plow and said block.

5. A gang plow of the character described, comprising a wheeled supporting frame, a crank shaft journaled therein, a block loosely mounted on said crank shaft and provided at its opposite ends respectively with a ball and with a shank terminating in a head, a slotted link pivotally connected to the frame and adapted to freely receive the shank of the block, a plow, universal connections between the beam of the plow and the ball of the block, a guide block secured to the aforesaid crank, and an arm secured to the plow beam and projecting through the guide block.

In witness whereof we have hereunto set our hands in the presence of two witnesses.

NELS SILLER.
ALBIN SILLER.

Witnesses:
R. H. BOULTON,
A. L. BONNYCASTLE.